Patented Nov. 4, 1930

1,780,326

UNITED STATES PATENT OFFICE

IRA WILLIAMS AND WALDO BRIGGS BURNETT, OF PITTSBURGH, PENNSYLVANIA, ASSIGNORS, BY MESNE ASSIGNMENTS, TO E. I. DU PONT DE NEMOURS & COMPANY, OF WILMINGTON, DELAWARE, A CORPORATION OF DELAWARE

ALDEHYDE AMINE CONDENSATION PRODUCT

No Drawing.    Application filed March 13, 1925. Serial No. 15,337.

This invention relates to the production of certain novel condensation products of amines and aldehydes.

We have found that one molecular proportion of amine will react directly with a plurality of molecular proportions of aldehyde under conditions whereby water is eliminated, and with the production of novel and useful condensation products. The chemical nature of this condensation, as well as the chemical composition of the end products, is not yet perfectly understood. The reaction is probably not a simple molecular one inasmuch as the physical properties of the condensation products change continually with changing proportions of the raw materials used to produce them. These condensation products are water-insoluble, but are easily soluble in organic solvents. They are usually of a highly unsaturated nature, absorbing even oxygen from the air.

The chemical composition of the hydrocarbon radicals attached to the nitrogen in the amines to be used for our process seems to be indifferent as far as the condensation with a plurality of molecular proportions of aldehyde is concerned, but it has an influence on the physical characteristic and the other properties of the condensation products.

Some of the amines that have been tested and give satisfactory products are aniline, n-butylamine, ethylamine, o-tolyldiguanide, ethylaniline, ethylene-diamine, etc. Although secondary amines will react in a manner similar to the primary amines, we prefer condensation products obtained from the primary amines, for certain uses for, which these new products are applicable, as mentioned below.

Among the aldehydes which are desirable for our purposes may be mentioned acetaldehyde, propionaldehyde, butyraldehyde, heptaldehyde, crotonaldehyde, citral, acetaldol and alpha-ethlyl-beta-propyl-acrolein. For certain purposes, as the vulcanization of rubber products, we prefer the condensation products obtained from amino bodies and those aldehydes in which the alpha and beta carbon atoms are linked by a single bond. For the purpose of this invention we will call this type of aldehyde bodies alpha-beta saturated aldehydes.

Our new products vary in consistency from mobile to very viscous liquids and in some cases they are practically non-crystalline solids at ordinary temperature. This, of course, will be governed by the amines and aldehydes and by their relative proportions.

As an example of our preferred type of product, we may mention the heptaldehyde condensation product of n-butylamine. This product is readily prepared by adding the aldehyde to the amine in the molecular proportions desired and heating to effect condensation and elimination of water. As the amount of aldehyde used is increased from one to five molecular proportions there is a gradual change in the properties of the product. After the addition of the aldehyde, the mixture is heated until all of the water formed in the condensation is substantially removed.

It will, of course, be understood that our invention is not limited to any particular manipulation in effecting the reaction. For example, the condensation may be carried out in the presence of suitable inert solvents if desired which may be later eliminated if desired; likewise the water of condensation may be removed by means of appropriate dehydrating agents. The operation may be otherwise modified in various respects without departing from our invention.

The speed of the reaction is dependent upon the temperature maintained which is usually limited by the boiling point at atmospheric pressure of one or both of the reacting substances. It is obvious that this temperature can be increased by effecting the reaction at super-atmospheric pressures.

We have found that our new condensation products have remarkable properties which distinguish them from the well-known equimolecular condensation products of aldehydes and amino bodies as well as from other aldehyde amine condensation products heretofore known. One use for our new products is in the vulcanization of rubber substances. While amino bodies themselves and the equimolecular condensation products are well-known as accelerators, as are also condensation products of three molecular proportions of aldehydes with two molecular proportions of nitrogenous bases, we find that by increasing the amount of aldehyde condensed with the amine above the proportions heretofore used, the curing power is not decreased but on the contrary increased gradually to a certain maximum, after which a slow decrease occurs. In numerous cases, we find that condensation products from one molecular proportion of amine and about twenty molecular proportions of aldehyde are just as strong, or even stronger, than equi-molecular condensation products. In the different series of aldehyde amine condensation products the maximum curing power is not always obtained in products having the same proportions of aldehyde and amine. The optimum proportions for this special use of our new compounds depend upon the chemical composition of the components, but is usually found in the ratio of from three to seven molecular proportions of the aldehyde to one molecular proportion of the amine.

Since we cannot assign simple chemical names to these aldehyde amine condensation products, for the purpose of this invention, we will use the following nomenclature:— The product obtained by causing an amine to react with a plurality of molecular proportions of an aldehyde we will designate as an aldehyde-amine (n:1). For example the condensation product obtained by causing butylamine to react with five molecular proportions of heptaldehyde we will designate as heptaldehyde-butylamine (5:1).

In order to further illustrate our invention, the following examples are given:

*Example 1.*—Forty-five and six-tenths parts of heptaldehyde are added to 14.6 parts of n-butyl amine, that is to say, in the proportion of two molecules of heptaldehyde to one molecule of n-butylamine. A vigorous reaction ensues, considerable heat is evolved, water is formed and separates from the reaction mixture. As the reaction becomes less vigorous the mixture is heated at reflux. After refluxing the mixture for about 4 hours there is no apparent increase in the amount of water formed. The reaction mixture is then cooled and dried over anhydrous sodium sulfate after which it is decanted off. The resulting condensation product is a light reddish brown, quite mobile liquid having a characteristic but not unpleasant odor. It is insoluble in water but is easily soluble in alcohol, benzene and other organic solvents.

*Example 2.*—Forty-eight and nine-tenths parts of heptaldehyde are added to 10.43 parts of n-butylamine, that is to say, in the proportion of three molecules of heptaldehyde to one molecule of n-butylamine. A vigorous reaction ensues, considerable heat is evolved, water is formed and separates from the reaction mixture. The mixture is allowed to stand over night and on the following morning it is heated at reflux. The reflux condenser is so arranged as to allow a separation of water and only the refluxing heptaldehyde and other refluxing reaction products are returned to the reaction vessel. After the mixture has been refluxed for about 5.5 hours there is no apparent increase in the amount of water formed and the reaction product has reached a temperature of about 170° C. The resulting condensation product is a reddish-brown, quite mobile liquid having a characteristic but not unpleasant odor. It is insoluble in water but is easily soluble in alcohol, benzene and other organic solvents.

*Example 3.*—Fifty-one parts of heptaldehyde are added to 6.53 parts of n-butylamine, that is to say, in the proportion of five molecules of heptaldehyde to one molecule of n-butylamine. A vigorous reaction ensues, considerable heat is evolved, water is formed and separates from the reaction mixture. The mixture is allowed to stand over night and on the following morning it is heated at reflux. The reflux condenser is so arranged as to allow a separation of water and only the refluxing heptaldehyde and other refluxing reaction products are returned to the reaction vessel. After the mixture has been refluxed for about 7 hours there is no apparent increase in the amount of water formed and the reaction product has reached a temperature of about 160° C. The resulting condensation product is a reddish-brown liquid having a characteristic but not unpleasant odor. It is insoluble in water but is easily soluble in alcohol, benzene and other organic solvents.

*Example 4.*—Fifty-five and eighty-six hundredths parts of heptaldehyde are added to 5.11 parts of n-butylamine, that is to say, in the proportion of seven molecules of heptaldehyde to one molecule of n-butylamine. A vigorous reaction ensues, considerable heat is evolved, water is formed and separates from the reaction mixture. As the reaction becomes less vigorous the mixture is heated at reflux. The reflux condenser is so arranged as to allow a separation of water and only the refluxing heptaldehyde and other refluxing reaction products are returned to the reaction vessel. After the reaction mixture has been refluxed for about 2 hours there is no apparent increase in the amount of water formed and the reaction product has reached a temperature of about 170° C. The resulting condensation product is a yellow, quite mobile liquid having a characteristic but not unpleasant odor. It is insoluble in water, but is easily soluble in alcohol, benzene, and other organic solvents.

*Example 5.*—Fifty-seven parts of heptaldehyde are added to 3.65 parts of n-butylamine, that is to say, in the proportion of ten molecules of heptaldehyde to one molecule of n-butylamine. A vigorous reaction ensues, considerable heat is evolved, water is formed and separates from the reaction mixture. As the reaction becomes less vigorous the mixture is heated at reflux. The reflux condenser is so arranged as to allow a separation of water and only the refluxing heptaldehyde and other refluxing reaction products are returned to the reaction vessel. After the reaction mixture has been refluxed for about 1.5 hours, it is allowed to stand over night and on the following morning it is again refluxed for about an hour. At the end of this time there is no apparent increase in the amount of water formed and the reaction product has reached a temperature of about 170° C. The resulting condensation product is a reddish-brown, quite mobile liquid, having a characteristic but not unpleasant odor. It is insoluble in water but is easily soluble in alcohol, benzene and other organic solvents.

*Example 6.*—Fifty-seven parts of heptaldehyde are added to 2.43 parts of n-butylamine, that is to say, in the proportion of fifteen molecules of heptaldehyde to one molecule of n-butylamine. A vigorous reaction ensues, considerable heat is evolved, water is formed and separates from the reaction mixture. As the reaction becomes less vigorous the mixture is heated at reflux. The reflux condenser is so arranged as to allow a separation of water and only the refluxing heptaldehyde and other refluxing reaction products are returned to the reaction vessel. After the reaction mixture has been refluxed for about 5.5 hours, there is no apparent increase in the amount of water formed and the reaction product has reached a temperature of about 180° C. The resulting condensation product is a reddish-brown, quite mobile liquid, having a characteristic but not unpleasant odor. It is insoluble in water but is easily soluble in alcohol, benzene and other organic solvents.

*Example 7.*—Thirty-six parts of n-butyraldehyde are added to 23.25 parts of aniline, that is to say, in the proportion of two molecules of n-butyraldehyde to one molecule of aniline. A vigorous reaction ensues, considerable heat is evolved, water is formed, and separates from the reaction mixture. As the reaction becomes less vigorous, the mixture is heated at reflux. The reflux condenser is so arranged as to allow a separation of water and only the refluxing n-butyraldehyde and other refluxing reaction products are returned to the reaction vessel. After the mixture has been refluxed for about 1.25 hours there is no apparent increase in the amount of water formed and the reaction product has reached a temperature of about 140° C. The resulting condensation product is a light yellow liquid about as mobile as aniline, having a characteristic but not unpleasant odor. It is insoluble in water but is easily soluble in alcohol, benzene and other organic solvents.

*Example 8.*—Forty-three and two-tenths parts of n-butyraldehyde are added to 18.6 parts of aniline, that is to say, in the porportion of three molecules of n-butyraldehyde to one molecule of aniline. A vigorous reaction ensues, considerable heat is evolved, water is formed and separates from the reaction mixture. As the reaction becomes less vigorous, the mixture is heated at reflux. The reflux condenser is so arranged as to allow a separation of water and only the refluxing n-butyraldehyde and other refluxing reaction products are returned to the reaction vessel. After the mixture has been refluxed for about 1.3 hours, it is allowed to stand over night and on the following morning is again refluxed for about 1 hour. At the end of this time there is no apparent increase in the amount of water formed and the reaction mixture has reached a temperature of about 130° C. The resulting condensation product is a light reddish-yellow liquid, about as mobile as aniline, having a characteristic but not unpleasant odor. It is insoluble in water but is easily soluble in alcohol, benzene and other organic solvents.

*Example 9.*—Fifty-one and four-tenths parts of n-butyraldehyde are added to 13.3 parts of aniline, that is to say, in the proportion of five molecules of n-butyraldehyde to one molecule of aniline. A vigorous reaction ensues, considerable heat is liberated, water is formed and separates from the reaction mixture. As the reaction becomes less vigorous the mixture is heated at reflux. The reflux condenser is so arranged as to allow a separation of water and only the refluxing n-butyraldehyde and other refluxing reaction products are returned to the reaction vessel. After the mixture has been refluxed for about 5 hours, it is allowed to stand over night and on the next morning it is again refluxed for about 6 hours. At the end of this time there is no apparent increase in the amount of water formed and the reaction mixture has reached a temperature of about 140° C. The resulting condensation product is a reddish-brown, quite mobile liquid, having a characteristic but not unpleasant odor. It is insoluble in water but is easily soluble in alcohol, benzene and other organic solvents.

*Example 10.*—Fifty and four-tenths parts of n-butyraldehyde are added to 9.3 parts of aniline, that is to say, in the proportion of seven molecules of n-butyraldehyde to one molecule of aniline. A vigorous reaction ensues, considerable heat is liberated, water is formed and separates from the mixture. As the reaction becomes less vigorous the mixture is heated at reflux. The reflux condenser is arranged so as to allow a separation of water and only the refluxing n-butyraldehyde and other refluxing reaction products are returned to the reaction vessel. The mixture is refluxed for about 4.3 hours and is then allowed to stand over night. On the following day it is again refluxed for about 13.5 hours. At the end of this time there is no apparent increase in the amount of water formed and the reaction product has reached a temperature of about 150° C. The resulting condensation product is a reddish-brown, quite mobile liquid, having a characteristic but not unpleasant odor. It is insoluble in water but is easily soluble in alcohol, benzene and other organic solvents.

*Example 11.*—Fifty and four-tenths parts of n-butyraldehyde are added gradually to 6.51 parts of aniline, that is to say, in the proportion of ten molecules of n-butyraldehyde to one molecule of aniline. About one-third of the total amount of aldehyde is added to the amine at first and a vigorous reaction ensues; considerable heat is evolved, water is formed and separates from the reaction mixture. As the reaction becomes less vigorous the mixture is heated at reflux. The reflux condenser is so arranged as to allow a separation of water and only the refluxing n-butyraldehyde and other refluxing reaction products are returned to the reaction vessel. The remainder of the aldehyde is added to the reaction mixture during 7 hours of refluxing. When the mixture has been refluxed for 5.5 hours it is allowed to stand over night and on the following morning it is again refluxed for 6.5 hours. At the end of this time there is no apparent increase in the amount of water formed and the reaction product has reached a temperature of about 150° C. The resulting condensation product is a reddish-brown, quite mobile liquid, having a characteristic but not unpleasant odor. It is insoluble in water but is easily soluble in alcohol, benzene and other organic solvents.

*Example 12.*—Fifty-four parts of n-butyraldehyde are added gradually to 4.65 parts of aniline, that is to say, in the proportion of fifteen molecules of n-butyraldehyde to one molecule of aniline. About one-third of the total amount of aldehyde is added to the amine at first and a vigorous reaction ensues; considerable heat is evolved, water is formed and separates from the reaction mixture. The reaction mixture is allowed to stand over night and on the following morning is heated at reflux. The reflux condenser is arranged so as to allow a separation of water and only the refluxing n-butyraldehyde and other refluxing reaction products are returned to the reaction vessel.

The remainder of the aldehyde is added to the reaction mixture during 15 hours of refluxing. The refluxing is continued for an additional 7 hours. At the end of this time there is no apparent increase in the amount of water formed and the reaction product has reached a temperature of about 155° C. The resulting condensation product is a reddish-brown, quite mobile liquid, having a characteristic but not unpleasant odor. It is insoluble in water but is easily soluble in alcohol, benzene and other organic solvents.

*Example 13.*—Five and seventy-six hundredths parts of n-butyraldehyde are added to 7.64 parts of o-tolyldiguanide, that is to say, in the proportion of two molecules of n-butyraldehyde to one molecule of o-tolyldiguanide. A vigorous reaction ensues and as this initial reaction decreases heat is applied. In the course of 30 minutes the reaction mass has become transparent, soft and sticky. The heating is continued for 15 minutes additional and then the product is dehydrated in an oven at 140° C. for about 30 minutes. The resulting condensation product is a light reddish-yellow non-crystalline brittle solid that softens at about 90° C.

*Example 14.*—Fourteen and four-tenths parts of n-butyraldehyde are added to 7.64 parts of o-tolyldiguanide, that is to say, in the proportion of five molecules of n-butyraldehyde to one molecule of o-tolyldiguanide. A vigorous reaction ensues, considerable heat is evolved, water is formed and separates from the reaction mixture. As the reaction becomes less vigorous the mixture is heated at reflux and is maintained at about 105° C. for 0.5 hour and then the temperature is increased to 120°–140° C. for another hour. The reaction mass is allowed to cool and the water that has formed is removed. It is then dehydrated in an oven at 140° C. for about 1.5 hours. The resulting condensation product is a dark amber colored semi-solid, showing a greenish-yellow fluorescence. It is insoluble in water but is soluble in alcohol, benzene and other organic solvents.

*Example 15.*—Ten and eight-hundredths parts of n-butyraldehyde are added to 3.82 parts of o-tolyldiguanide, that is to say, in the proportion of seven molecules of n-butyraldehyde to one molecule of o-tolyldiguanide. A vigorous reaction ensues, heat is evolved, water is formed and separates from the reaction mixture. As the reaction becomes less vigorous, heat is applied and the mixture is maintained at reflux for about 45 minutes. The water that has been formed is then removed and the reaction mass is dehydrated on a hot plate. The resulting condensation product is a clear amber colored semi-solid, showing a greenish-yellow fluorescence. It is insoluble in water but is soluble in alcohol, benzene and other organic solvents.

*Example 16.*—Fourteen and four-tenths parts of n-butyraldehyde are added to 3.82 parts of o-tolyldiguanide, that is to say, in the proportion of ten molecules of n-butyraldehyde to one molecule of o-tolyldiguanide. A vigorous reaction ensues, considerable heat is evolved, water is formed and separates from the reaction mixture. As the reaction becomes less vigorous the mixture is heated at reflux for about 2 hours. The water that has been formed is then removed and the reaction mass is dehydrated in an oven at 140° C. for about an hour. The resulting condensation product is a light reddish-brown, very sticky semi-solid, showing a greenish-yellow fluorescence. It is insoluble in water but is easily soluble in alcohol, benzene and other organic solvents.

Example 17.—Ten and eight-tenths parts of n-butyraldehyde are added to 1.91 parts of o-tolyldiguanide, that is to say, in the proportion of fifteen molecules of n-butyraldehyde to one molecule of o-tolyldiguanide. A vigorous reaction ensues, considerable heat is evolved, water is formed and separates from the reaction mixture. As the reaction becomes less vigorous the mixture is heated at reflux for about 4 hours. The mixture is allowed to cool and the water that has been formed is removed. The mixture is then dehydrated in an oven at 140° C. for about an hour. The resulting condensation product is reddish-brown, sticky semi-solid, showing a greenish-yellow fluorescence. It is insoluble in water but is easily soluble in alcohol, benzene, and other organic solvents.

Example 18.—Thirty-six parts of n-butyraldehyde are added to 7.3 parts of n-butylamine, that is to say, in the proportion of five molecules of n-butyraldehyde to one molecule of n-butylamine. A vigorous reaction ensues, considerable heat is evolved, water is formed and separates from the reaction mixture. The mixture is allowed to stand over night and on the following morning the water that has formed is removed and the reaction mixture is heated at about 120° C. for 2 hours. The water that has formed is again removed and the mixture is again heated at about 140° C. for 1.5 hours, after which apparently no additional water separates. The resulting condensation product is a light reddish-brown, quite mobile liquid, having a characteristic amine-like odor. It is insoluble in water but is easily soluble in alcohol, benzene and other organic solvents.

Example 19.—Fourteen and four-tenths parts of n-butyraldehyde are added to 1.46 parts of n-butylamine, that is to say, in the proportion of ten molecules of n-butyraldehyde to one molecule of n-butylamine. A vigorous reaction ensues, considerable heat is evolved, water is formed and separates from the reaction mixture. The mixture is allowed to stand over night and on the following morning the water that has separated is removed and the reaction mixture heated at about 120° C. for 4 hours. The water that has separated is again removed and the heating continued for an additional 4 hours. After the water has again been removed the heating is continued for 2 hours additional at about 140° C. and at the end of this time there is no apparent increase in the amount of water formed. The resulting condensation product is a light reddish-brown, quite mobile liquid, with a characteristic but not unpleasant odor. It is insoluble in water but is easily soluble in alcohol, benzene and other organic solvents.

Example 20.—Sixteen and two-tenths parts of n-butyraldehyde are added to 1.095 parts of n-butylamine, that is to say, in the proportion of fifteen molecules of n-butyraldehyde to one molecule of n-butylamine. A vigorous reaction ensues, considerable heat is evolved, water is formed and separates from the reaction mixture. The mixture is allowed to stand over night and on the following morning the water that has separated is removed and the reaction mixture heated at about 120° C. for 4 hours. The water that has separated is again removed and the heating continued for an additional 5 hours. After the water has again been removed, the heating is continued for 3 hours at about 140° C. and at the end of this time there is no apparent increase in the amount of water formed. The resulting condensation product is a light reddish-brown, quite mobile liquid, having a characteristic but not unpleasant odor. It is insoluble in water but is easily soluble in alcohol, benzene and other organic solvents.

Example 21.—Forty-one and forty-three hundredths parts of n-propionaldehyde are added to 13.3 parts of aniline that is to say in the proportion of five molecules of n-propionaldehyde to one molecule of aniline. A vigorous reaction ensues, heat is evolved, water is formed and separates from the reaction mixture. As the reaction becomes less vigorous the mixture is heated at reflux. The reflux condenser is so arranged as to allow a separation of water and only the refluxing heptaldehyde and other refluxing reaction products are returned to the reaction vessel. The mixture is refluxed for 6 hours and is then allowed to stand over night. The next day it is again refluxed for 8 hours. During this time the water that has separated is returned to the reaction vessel three times in order to make certain that any dissolved n-propionaldehyde has reacted. At the end of this time there is no apparent increase in the amount of water formed and the reaction mixture has reached a temperature of about 150° C. The resulting condensation product is a reddish-brown, quite mobile liquid with a characteristic but not unpleasant odor. It is insoluble in water but is easily soluble in alcohol, benzene and other organic solvents.

*Example 22.*—Seventeen and five-tenths parts of crotonaldehyde are added to 2.25 parts of ethylamine, that is to say in the proportion of five molecules of crotonaldehyde to one molecule of ethylamine. (The ethyl amine is conveniently used in the form of a 33% water solution). A vigorous reaction ensues, considerable heat is evolved, water is formed and separates from the mixture. As the reaction becomes less vigorous heat is applied and the mixture is heated at reflux for about 5 hours and is then allowed to stand overnight. During this time the mixture gradually darkens in color. On the following morning it is again heated at reflux for about 3 hours. The water that has formed is then removed and the mixture again heated at about 140° C. for 1 hour. The resulting condensation product is a dark reddish brown, brittle, non-crystalline solid. It is insoluble in water but is easily soluble in alcohol, benzene and other organic solvents.

In the preparation of any of the other examples that are listed below substantially the same procedure may be followed. When secondary amines are used the reaction is more sluggish and proceeds more slowly.

Amongst the various condensation products which we have prepared and which are believed to have valuable properties are the following:—acetaldehyde aniline (5:1) (a dark reddish-brown, brittle, non-crystalline solid); n-butyraldehyde guanidine (5:1) (a viscous orange liquid); n-butyraldehyde methyl amine (5:1) (a reddish brown liquid); n-butyraldehyde ethyl amine (5:1) (a reddish-brown liquid); n-butyraldehyde di-ethyl amine (5:1) (a light reddish-brown liquid); n-butyraldehyde ethylaniline (5:1) (a reddish brown liquid); n-butyraldehyde methylamine (10:1) (a reddish brown liquid); n-butyraldehyde ethylene diamine (10:1) (a reddish brown liquid); n-butyraldehyde ethyl amine (15:1) (a reddish-brown liquid); heptaldehyde ethyl amine (5:1) (a reddish-brown liquid); heptaldehyde o-tolyldiguanide (5:1) (a light reddish-yellow, very viscous and very sticky liquid, showing a greenish-yellow fluorescence); acetaldol ethylamine (5:1) (a reddish-brown semi-solid very much like ethylidene aniline in appearance); acetaldol n-butylamine (5:1) (a reddish-brown semi-solid very much like ethylidene aniline in appearance); acetaldol o-tolyldiguanide (5:1) (a reddish-yellow, brittle, non-crystalline solid); crotonaldehyde aniline (5:1) (a dark reddish-brown, brittle, non-crystalline solid); citral o-tolyldiguanide (5:1) (a reddish-yellow, very viscous, and very sticky liquid, showing a greenish-yellow fluorescence).

We claim:—

1. As new compositions of matter, the condensation products resulting from the direct reaction with the elimination of water from the reaction mixture during the condensation reaction of one molecular proportion of an amine body with more than two molecular proportions of aliphatic aldehyde having a plurality of carbon atoms in the molecule, which products are yellowish to brown colored, liquid, semi-solid or amorphous solid substances insoluble in water, soluble in organic solvents, highly unsaturated and which absorb oxygen from the air.

2. As new compositions of matter, the condensation products resulting from the reaction with the elimination of water from the reaction mixture during the condensation reaction of one molecular proportion of an amino body with from more than 2 to 20 molecular proportions of an aliphatic aldehyde having a plurality of carbon atoms in the molecule, which products are yellowish to brown colored, liquid, semi-solid or amorphous solid substances insoluble in water, soluble in organic solvents, highly unsaturated and which absorb oxygen from the air.

3. As new compositions of matter, the condensation products resulting from the reaction with the elimination of water from the reaction mixture during the condensation reaction of one molecular proportion of an amino body with from 3 to 7 molecular proportions of an aliphatic aldehyde having a plurality of carbon atoms in the molecule which products are yellowish to brown colored, liquid, semi-solid or armorphous solid substances insoluble in water, soluble in organic solvents, highly unsaturated and which absorb oxygen from the air.

4. As new compositions of matter, the condensation products resulting from the reaction with the elimination of water from the reaction mixture during the condensation reaction of one molecular proportion of a primary amine with more than two molecular proportions of an aliphatic aldehyde having a plurality of carbon atoms in the molecule which products are yellowish to brown colored, liquid, semi-solid or amorphous solid substances insoluble in water, soluble in organic solvents, highly unsaturated and which absorb oxygen from the air.

5. As new compositions of matter, the condensation products resulting from the reaction with the elimination of water from the reaction mixture during the condensation reaction of one molecular proportion of a primary amine with from more than 2 to 20 molecular proportions of an aliphatic aldehyde having a plurality of carbon atoms in the molecule which products are yellowish to brown colored, liquid, semi-solid or amorphous solid substances insoluble in water, soluble in organic solvents, highly unsaturated and which absorb oxygen from the air 6. As new compositions of matter, the condensation products resulting from the reaction with the elimination of water from the reaction mixture during the condensation reaction of one molecular proportion of a primary amine with from 3 to 7 molecular proportions of an aliphatic aldehyde having a plurality of carbon atoms in the molecule which products are yellowish to brown colored, liquid, semi-solid or amorphous solid substances insoluble in water, soluble in organic solvents, highly unsaturated and which absorb oxygen from the air.

7. As new compositions of matter the condensation products resulting from the reaction with the elimination of water from the reaction mixture during the condensation reaction of one molecular proportion of an amino body with more than two molecular proportions of an aliphatic alpha-beta saturated aldehyde which products are yellowish to brown colored, liquid, semi-solid or amorphous solid substances insoluble in water, soluble in organic solvents, highly unsaturated and which absorb oxygen from the air.

8. As new compositions of matter, the condensation products resulting from the reaction with the elimination of water from the reaction mixture during the condensation reaction of one molecular proportion of an amino body with from more than 2 to 20 molecular proportions of an aliphatic alpha-beta saturated aldehyde, which products are yellowish to brown colored, liquid, semi-solid or amorphous solid substances insoluble in water, soluble in organic solvents, highly unsaturated and which absorb oxygen from the air.

9. As new compositions of matter, the condensation products resulting from the reaction with the elimination of water from the reaction mixture during the condensation reaction of one molecular proportion of an amino body with from 3 to 7 molecular proportions of an aliphatic alpha-beta saturated aldehyde, which products are yellowish to brown colored, liquid, semi-solid or amorphous solid substances insoluble in water, soluble in organic solvents, highly unsaturated and which absorb oxygen from the air.

10. As new compositions of matter, the condensation products resulting from the reaction with the elimination of water from the reaction mixture during the condensation reaction of one molecular proportion of a primary amine with more than two molecular proportions of an aliphatic alpha-beta saturated aldehyde, which products are yellowish to brown colored, liquid, semi-solid or amorphous solid substances, insoluble in water, soluble in organic solvents, highly unsaturated and which absorb oxygen from the air.

11. As new compositions of matter, the condensation products resulting from the reaction with the elimination of water from the reaction mixture during the condensation reaction of one molecular proportion of a primary amine with from more than 2 to 20 molecular proportions of an aliphatic alpha-beta saturated aldehyde, which products are yellowish to brown colored liquid, semi-solid or amorphous solid substances, insoluble in water, soluble in organic solvents, highly unsaturated and which absorb oxygen from the air.

12. As new compositions of matter, the condensation products resulting from the reaction with the elimination of water from the reaction mixture during the condensation reaction of one molecular proportion of a primary amine with from 3 to 7 molecular proportions of an aliphatic alpha-beta saturated aldehyde, which products are yellowish to brown colored liquid, semi-solid or amorphous solid substances, insoluble in water, soluble in organic solvents, highly unsaturated and which absorb oxygen from the air.

13. The process of condensing aldehydes with amino bodies which comprises causing one molecular proportion of an amino body to react directly with at least 3 molecular proportions of an aldehyde having more than two carbon atoms in the molecule under conditions whereby water is eliminated from the reaction mixture during the condensation reaction.

14. The process of condensing aldehydes and amino bodies which consists in causing one molecular proportion of a primary amine to react directly with at least 3 molecular proportions of an alpha-beta-saturated aldehyde under conditions whereby water is eliminated from the reaction mixture during the condensation reaction.

15. The process of condensing aldehydes with amino bodies which consists in causing one molecular proportion of a primary aromatic amine to react directly with at least 3 molecular proportions of an alpha-beta-saturated aldehyde under conditions whereby water is eliminated from the reaction mixture during the condensation reaction.

16. The process of condensing butyraldehyde with aniline which consists in causing one molecular proportion of aniline to react directly with at least three molecular proportions of butyraldehyde under conditions whereby water is eliminated from the reaction mixture during the condensation reaction.

IRA WILLIAMS.
WALDO BRIGGS BURNETT.